(12) United States Patent
Ooki et al.

(10) Patent No.: US 9,423,610 B2
(45) Date of Patent: Aug. 23, 2016

(54) OPTICAL SCANNING APPARATUS

(71) Applicant: Konica Minolta, Inc., Chiyoda-ku, Tokyo (JP)

(72) Inventors: Makoto Ooki, Toyohashi (JP); Masahiko Takahashi, Toyokawa (JP); Wataru Senoo, Okazaki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/995,497

(22) Filed: Jan. 14, 2016

(65) Prior Publication Data
US 2016/0209644 A1    Jul. 21, 2016

(30) Foreign Application Priority Data
Jan. 15, 2015 (JP) .................... 2015-005768

(51) Int. Cl.
| | |
|---|---|
| *G03G 15/00* | (2006.01) |
| *G02B 26/12* | (2006.01) |
| *G02B 26/10* | (2006.01) |
| *G02B 27/00* | (2006.01) |
| *G03G 15/04* | (2006.01) |

(52) U.S. Cl.
CPC .......... *G02B 26/125* (2013.01); *G02B 26/105* (2013.01); *G02B 27/0018* (2013.01); *G03G 15/04036* (2013.01)

(58) Field of Classification Search
USPC .......... 399/1–7, 31, 32, 107, 110, 118, 177, 399/220, 221; 347/129; 359/204.1, 205.1, 359/206.1, 212.1, 216.1
See application file for complete search history.

(56) References Cited

U.S. PATENT DOCUMENTS

| | | | | |
|---|---|---|---|---|
| 5,774,249 A | * | 6/1998 | Shiraishi ............. | G02B 26/124 347/243 |
| 5,903,379 A | * | 5/1999 | Kamikubo .......... | G02B 26/125 359/212.1 |

FOREIGN PATENT DOCUMENTS

| | | |
|---|---|---|
| JP | 09-033842 A | 2/1997 |
| JP | 2006-171117 A | 6/2006 |
| JP | 2007-140418 A | 6/2007 |
| JP | 2009-258577 A | 11/2009 |
| JP | 2012-088612 A | 5/2012 |

* cited by examiner

*Primary Examiner* — Hoan Tran
(74) *Attorney, Agent, or Firm* — Buchanan Ingersoll & Rooney PC

(57) ABSTRACT

An optical scanning apparatus has a first scanning optical element having a negative power in a sub-scanning direction. A first light beam and a second light beam enter the first scanning optical element through points of an input surface on a same side of a reference surface, which includes an optical axis of the first scanning optical element and being parallel to a main-scanning direction. The second light beam makes a greater angle with the reference surface than the first light beam. A first angle between the reference surface and a principal ray of a first ghost light beam is greater than a second angle between the reference surface and a principal ray of a first normal light beam and is smaller than a third angle between the reference surface and a principal ray of a second normal light beam.

15 Claims, 11 Drawing Sheets

F I G . 4
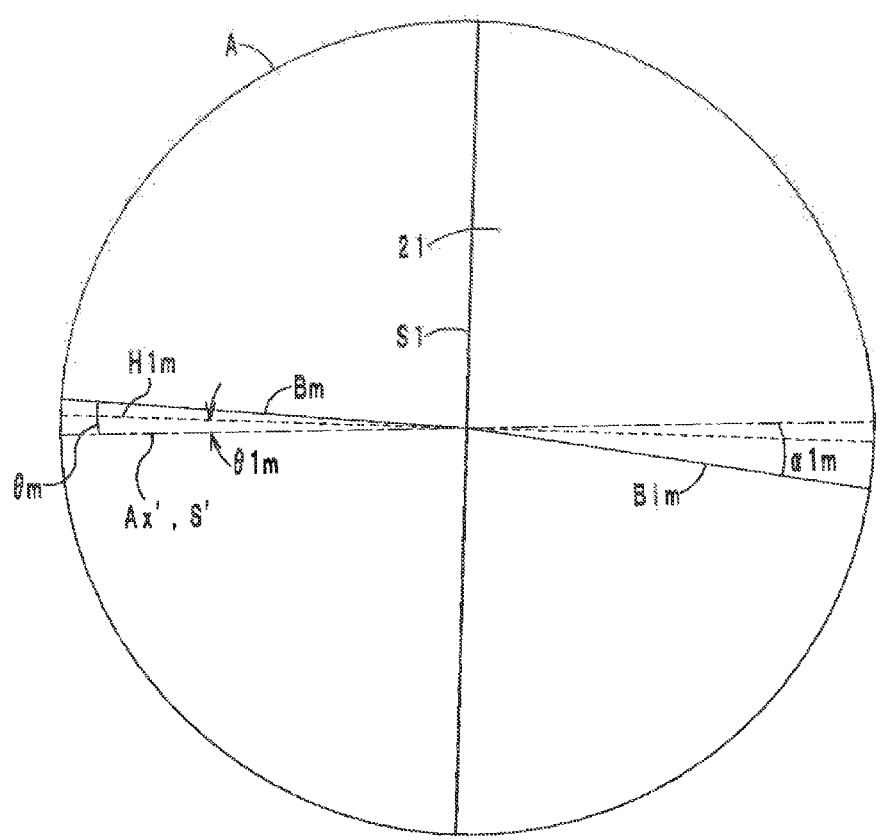

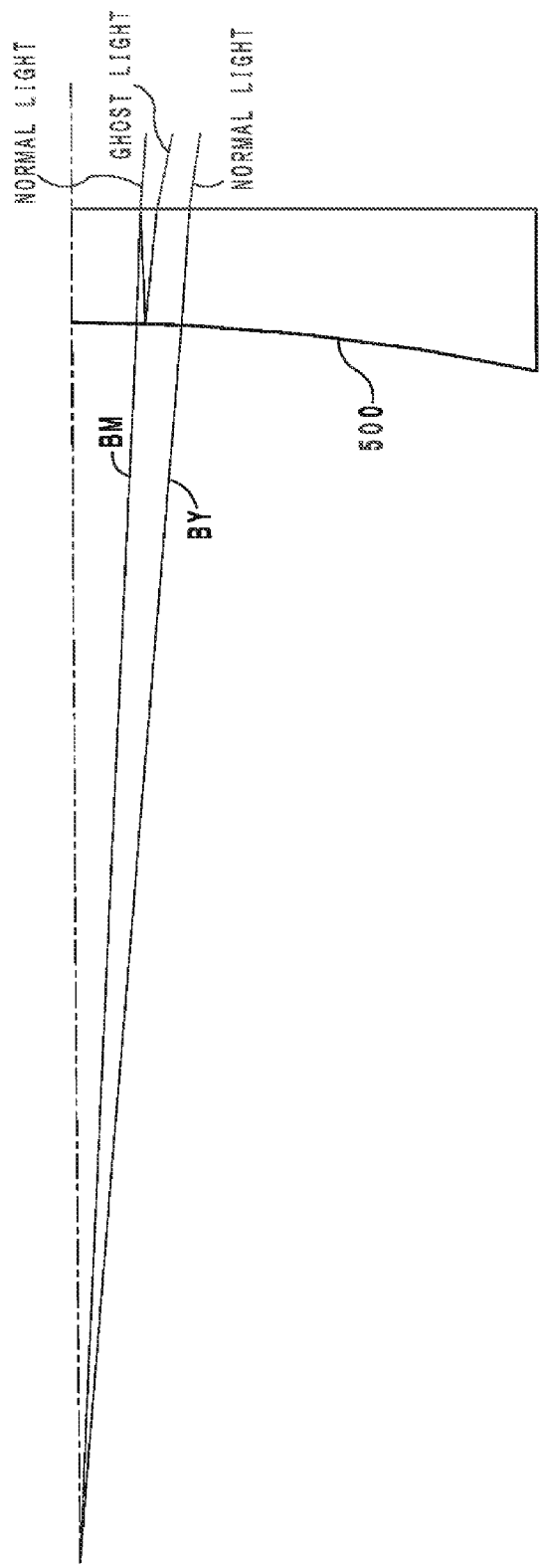

OPTICAL SCANNING APPARATUS

This application claims the benefit of priority to Japanese Patent Application No. 2015-005768 filed Jan. 15, 2015, the entire content of which is incorporated herein by reference.

BACKGROUND OF THE INVENTION

The present invention relates to an optical scanning apparatus, and more particularly to an optical scanning apparatus configured to scan a surface with light.

An optical scanning apparatus generally comprises a light source, a deflector and a scanning lens. The light source emits light. The deflector deflects the light emitted from the light source. The scanning lens focuses the light deflected by the deflector on a photoreceptor. Thereby, an electrostatic latent image is formed on the photoreceptor.

Such an optical scanning apparatus generally has a problem of causing a ghost image on a photoreceptor. Specifically, the scanning lens has an input surface and an output surface. The most part of light deflected by the deflector enters the scanning lens through the input surface and exits the scanning lens through the output surface as normal light. However, a part of light deflected by the deflector enters the scanning lens through the input surface and is reflected by the output surface and the input surface. Thereafter, the light exits the scanning lens through the output surface as ghost light. The ghost light is focused on a point a little shifted from the point on which the normal light is focused. Consequently, a ghost image is formed on the photoreceptor.

As an optical scanning apparatus that can prevents a ghost image from forming, for example, an optical scanning apparatus disclosed in Japanese Patent Laid-Open Publication No. 2012-88612 is known. The optical scanning apparatus includes a first scanning lens and a second scanning lens. The second scanning lens is located downstream from the first scanning lens in the light traveling direction. In the optical scanning apparatus, the first scanning lens and the second scanning lens are arranged such that ghost light generated by the first scanning lens does not enter the second scanning lens. Specifically, the first scanning lens changes the traveling direction of the ghost light generated thereby such that the ghost light passes by one side of the second scanning lens in a sub-scanning direction. In this way, the ghost light is prevented from forming a ghost image.

However, in the optical scanning apparatus disclosed in Japanese Patent Laid-Open Publication No. 2012-88612, in a case in which a plurality of light beams (for example, four light beams) are deflected, the prevention of a ghost image may not be enough. This will be described referring to FIG. 12. FIG. 12 illustrates the first scanning lens 500 and two light beams BM and BY passing through the first scanning lens 500.

In an image forming apparatus capable of forming a full-color image, an optical scanning apparatus scans a photoreceptor with four light beams BY, BM, BC and BK. In this case, the four light beams BY, BM, BC and BK deflected by a deflector pass through the first scanning lens 500 in different positions with respect to the sub-scanning direction. The following description with reference to FIG. 12 focuses on the light beams BY and BM adjacent to each other in the sub-scanning direction.

In the optical scanning apparatus disclosed in Japanese Patent Laid-Open Publication No. 2012-88612, the first scanning lens 500 inclines the ghost light of the light beam BM downward (to one side in the sub-scanning direction) from the normal light of the light beam BM. Below the light beam BM, however, the light beam BY passes. Therefore, there is a possibility that the ghost light of the light beam BM would enter a photoreceptor to be scanned with the normal light of the light beam BY. Thus, there is a possibility that the ghost light of the light beam BM would form a ghost image on the photoreceptor to be scanned with the light beam BY.

SUMMARY OF THE INVENTION

An object of the present invention is to provide an optical scanning apparatus that can reduce or eliminate the risk of formation of a ghost image.

An optical scanning apparatus according to an embodiment comprises: a light source configured to emit a plurality of light beams including a first light beam and a second light beam; a deflector configured to deflect the plurality of light beams in a main-scanning direction; and a scanning optical element group configured to focus the deflected light beams on a plurality of surfaces to be scanned, wherein: the scanning optical element group includes a first scanning optical element having an input surface and an output surface and having a negative power in a sub-scanning direction, the plurality of light beams entering the first scanning optical element through the input surface and exiting the first scanning optical element through the output surface; the first light beam and the second light beam enter the first scanning optical element through points of the input surface on a same side of a reference surface including an optical axis of the first scanning optical element and being parallel to the main-scanning direction; when the first light beam and the second light beam entering through points of the incident surface located at a same position in the main-scanning direction are compared with each other, an angle between the reference surface and a principal ray of the second light beam is greater than an angle between the reference surface and a principal ray of the first light beam; and when the first light beam and the second light beam entering through points of the incident surface located at a same position in the main-scanning direction are compared with each other, a first angle between the reference surface and a principal ray of a first ghost light beam is greater than a second angle between the reference surface and a principal ray of a first normal light beam and is smaller than a third angle between the reference surface and a principal ray of a second normal light beam, the first ghost light beam being a part of the first light beam exiting through the output surface after being reflected by the output surface and the input surface, the first normal light beam being another part of the first light beam exiting through the output surface without being reflected by either of the input surface and the output surface, the second normal light beam being a part of the second light beam exiting through the output surface without being reflected by either of the input surface and the output surface.

BRIEF DESCRIPTION OF THE DRAWINGS

FIG. 4 is a magnified view of the portion A in FIG. 3.

FIG. 12 is a view indicating a first scanning lens 500 and two light beams BM and BY passing through the first scanning lens 500.

DETAILED DESCRIPTION OF THE PREFERRED EMBODIMENTS

An optical scanning apparatus according to an embodiment of the present invention will hereinafter be described with reference to the drawings.

Structure of Optical Scanning Apparatus

Figure 1:
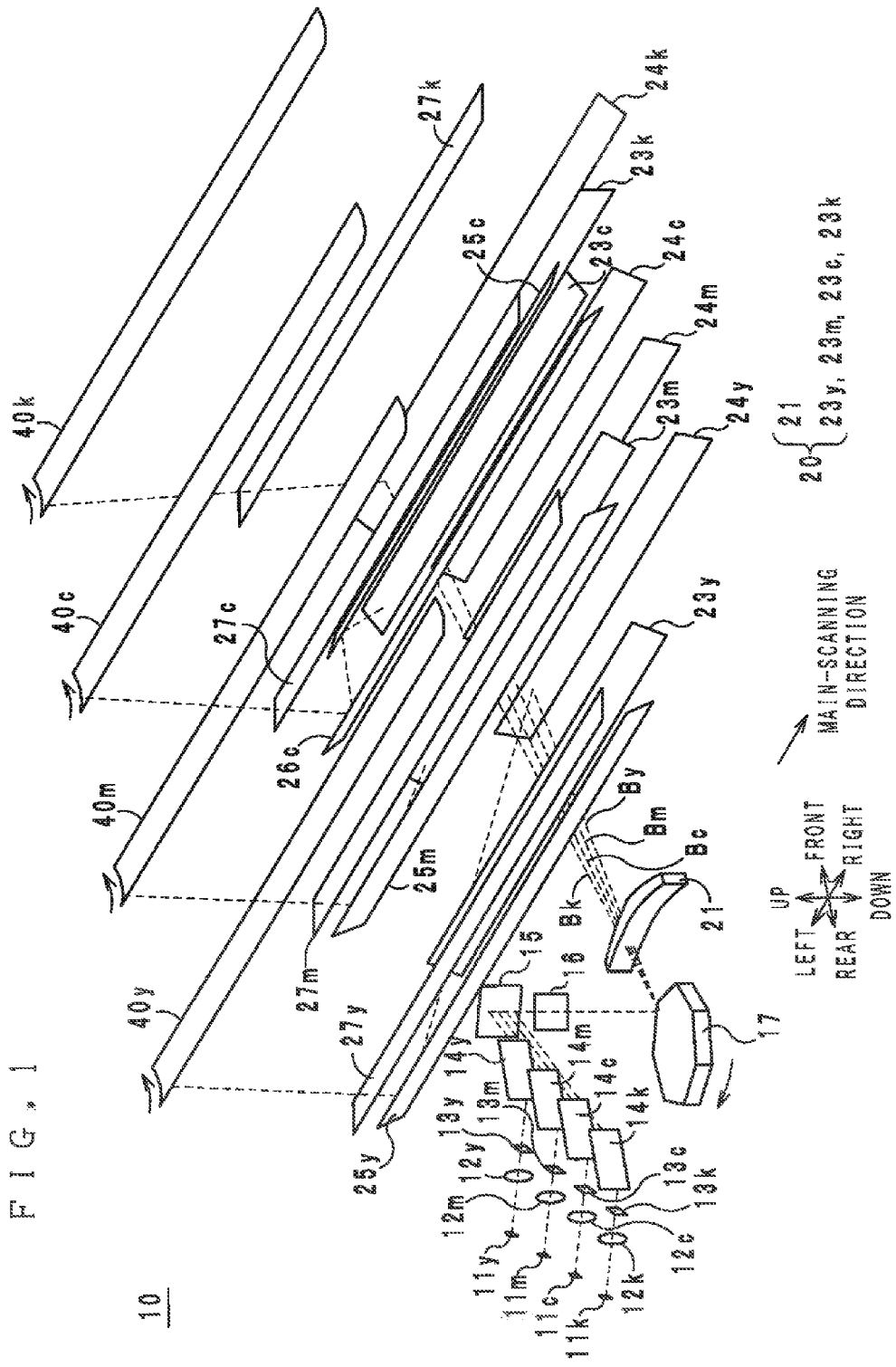
FIG. 1 is a perspective view of an optical scanning apparatus 10 according to an embodiment of the present invention.
Figure 2:
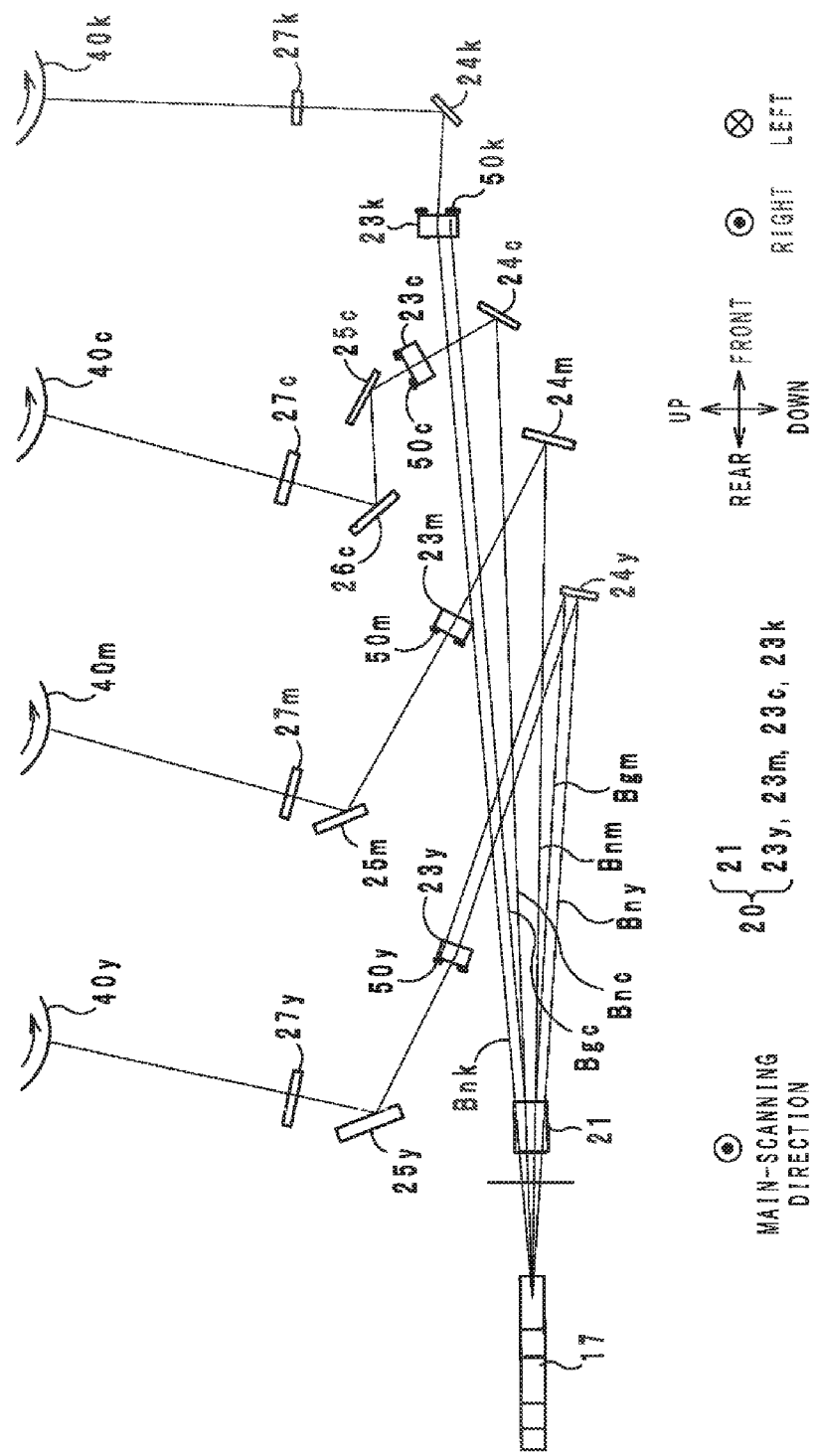
FIG. 2 is a plan view of the optical scanning apparatus 10 when viewed from right.

FIG. 1 is a perspective view of an optical scanning apparatus 10 according to an embodiment of the present invention. FIG. 2 is a plan view of the optical scanning apparatus 10 when viewed from right. In the following description, the direction in which the rotation axis of a deflector 17 extends is referred to as up-down direction, and the direction in which photoreceptor drums 40y, 40m, 40c and 40k extend is referred to as right-left direction. The direction in which the photoreceptor drums 40y, 40m, 40c and 40k are arranged is referred to as front-rear direction. The up-down direction, the right-left direction and the front-rear direction are perpendicular to one another. In the following description, a main-scanning direction means the direction in which light beams By, Bm, Bc and Bk are deflected, and a sub-scanning direction means the direction opposite to a direction in which the photoreceptor drums 40y, 40m, 40c and 40k rotate. The main-scanning direction and the sub-scanning direction are perpendicular to each other. The definitions of the up-down direction, the right-left direction and the front-rear direction are merely exemplary definitions of directions.

The optical scanning apparatus 10 is to scan the photoreceptor drums 40y, 40m, 40c and 40k (surfaces to be scanned) with light beams By, Bm, Bc and Bk. As illustrated in FIG. 1, the optical scanning apparatus 10 comprises a light source 11y (yellow), 11m (magenta), 11c (cyan) and 11k (black), collimator lenses 12y, 12m, 12c and 12k, diaphragms 13y, 13m, 13c and 13k, composite mirrors 14y, 14m, 14c and 14k, a mirror 15, a cylindrical lens 16, a deflector 17, a scanning lens group 20, mirrors 24y, 24m, 24c, 24k, 25y, 25m, 25c and 26c, dust protective windows 27y, 27m, 27c and 27k, and preventive members 50y, 50m, 50c and 50k.

The light beams By, Bm, Bc and Bk are emitted from light sources 11y, 11m, 11c and 11k, respectively. The light sources 11y, 11m, 11c and 11k are laser diodes, for example. As seen in FIG. 1, the light sources 11y, 11m, 11c and 11k are arranged in this order from upper to lower. Accordingly, the light beams By, Bm, Bc and Bk emitted from the light sources 11y, 11m, 11c and 11k are arranged in this order from upper to lower.

The collimator lenses 12y, 12m, 12c and 12k are arranged to face the light sources 11y, 11m, 11c and 11k, respectively, and collimate the light beams By, Bm, Bc and Bk, respectively. The diaphragms 13y, 13m, 13c and 13k shape the collimated light beams By, Bm, Bc and Bk, respectively, such that each of the light beams By, Bm, Bc and Bk will have a predetermined width (a predetermined dimension in the up-down direction).

The composite mirrors 14y, 14m, 14c, 14k reflect the light beams By, Bm, Bc and Bk, respectively, such that the light beams By, Bm, Bc and Bk will travel in the same direction. The mirror 15 reflects the light beams By, Bm, Bc and Bk caused to travel in the same direction by the composite mirrors.

The cylindrical lens 16 converges the light beams By, Bm, Bc and Bk with respect to the up-down direction so as to focus the light beams By, Bm, Bc and Bk linearly near reflective surfaces of the deflector 17.

The deflector 17 includes a polygon mirror and a motor (not illustrated in the drawings), and deflects the light beams By, Bm, Bc and Bk in the main-scanning direction. The polygon mirror is rotated counterclockwise when viewed from top. Accordingly, the main-scanning direction is the direction from left to right.

The scanning lens group 20 focuses the light beams By, Bm, Bc and Bk deflected by the deflector 17 on the peripheral surfaces of the photoreceptor drums 40y, 40m, 40c and 40k. More specifically, the scanning lens group 20 has such optical characteristics that the light beams By, Bm, Bc and Bk scan the corresponding photoreceptor drums 40y, 40m, 40c and 40k, respectively, at a constant speed and that the beam diameters of the light beams By, Bm, Bc and Bk on the corresponding photoreceptor drums 40y, 40m, 40c and 40k are uniform. The scanning lens group includes scanning lenses 21, 23y, 23m, 23c and 23k. The scanning lenses 23y, 23m, 23c and 23k are located downstream from the scanning lens 21 in the light beam traveling direction.

The mirrors 24y, 24m, 24c, 24k, 25y, 25m, 25c and 26c reflect the light beams By, Bm, Bc and Bk after passing through the scanning lens 21 to direct the light beams By, Bm, Bc and Bk toward the photoreceptor drums 40y, 40m, 40c and 40k. More specifically, the light beam By is reflected by the mirror 24y and passes through the scanning lens 23y. Thereafter, the light beam By is reflected by the mirror 25y and passes through the dust-protective window 27y. Then, the light beam By is focused on the photoreceptor drum 40y. The light beam Bm is reflected by the mirror 24m and passes through the scanning lens 23m. Thereafter, the light beam Bm is reflected by the mirror 25m and passes through the dust-protective window 27m. Then, the light beam Bm is focused on the photoreceptor drum 40m. The light beam Bc is reflected by the mirror 24c and passes through the scanning lens 23c. Thereafter, the light beam Bc is reflected by the mirrors 25c and 26c, and passes through the dust-protective window 27c. Then, the light beam Bc is focused on the photoreceptor drum 40c. The light beam Bk passes through the scanning lens 23k and is reflected by the mirror 24k. Thereafter, the light beam passes through the dust-protective window 27k and is focused on the photoreceptor drum 40k.

Meanwhile, the photoreceptor drums 40y, 40m, 40c and 40k are driven by a motor (not illustrated in the drawings) to rotate at a constant speed. The rotating direction of the photoreceptor drums 40y, 40m, 40c and 40k is a counterclockwise direction when viewed from right. In the structure as described above, the photoreceptor drums 40y, 40m, 40c and 40k are scanned with the beams By, Bm Bc and Bk while rotating, and accordingly, electrostatic latent images are formed on the photoreceptor drums 40y, 40m, 40c and 40k.

Structure of Scanning Lens 21

Figure 3:
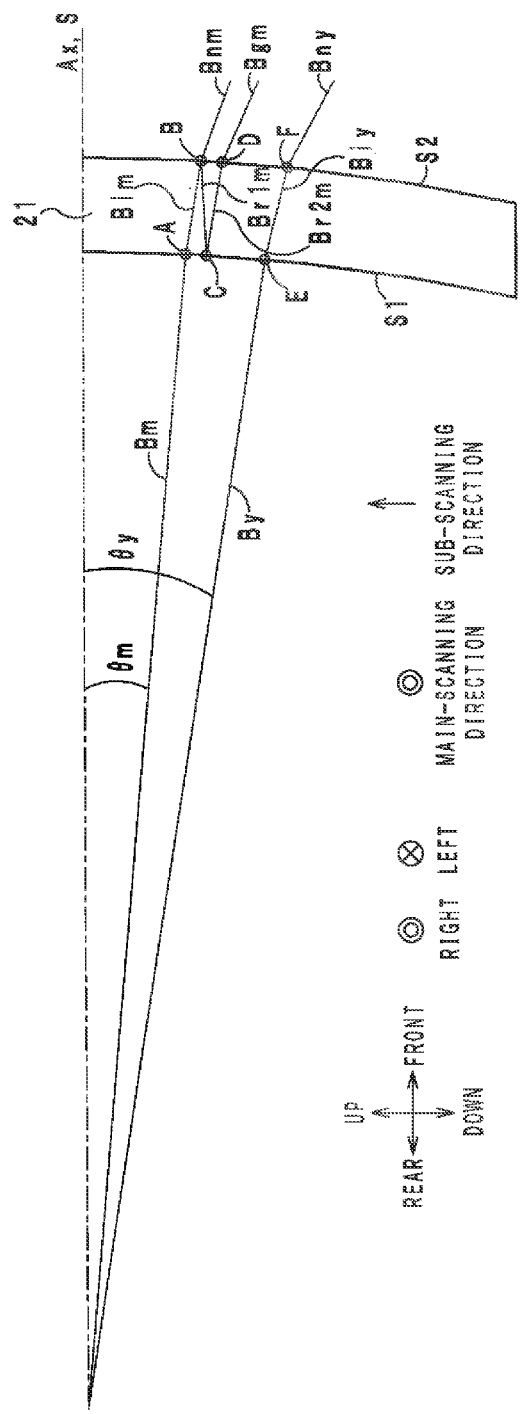
FIG. 3 is a plan view of the optical scanning apparatus 10 when viewed from a main-scanning direction, indicating principal rays of light beams.

The scanning optical apparatus 10 has a structure to prevent ghost images from forming. The structure will hereinafter be described with reference to the drawings. In the description below, a case of the light beams By and Bm will be taken as an example. FIG. 3 indicates the paths of the principal rays of the light beams By and Bm when the optical scanning apparatus 10 is viewed from the main-scanning direction. FIGS. 4-9 are magnified views of the portions A-F in FIG. 3, respectively. FIGS. 3-9 are sectional views cut along surfaces in parallel to the sub-scanning direction, and the sectional views include the optical axis Ax. The principal ray means a ray of a light beam passing through the center of the diaphragm 13. The plane including the optical axis Ax and being parallel to the main-scanning direction will hereinafter be referred to as a reference surface S.

Now, the directions indicated in FIGS. 3-9 are described. In FIGS. 3-9, the main-scanning direction is indicated as a direction from left to right. The sub-scanning direction of the scanning lens 21 corresponds to a direction opposite to the rotating direction of the photoreceptor drums 40y, 40m, 40c and 40k, and more specifically, is a direction from lower to upper.

The scanning lens 21 has two surfaces. The surface through which the light beams By, Bm, Bc and Bk enter the scanning lens 21 will hereinafter be referred to as an input surface S1, and the surface through which the light beams By, Bm, Bc and Bk exit the scanning lens 21 will hereinafter be referred to as an output surface S2. The input surface S1 is concave on a sub-scanning section (a section in parallel to the sub-scanning direction) including the optical axis Ax. The output surface S2 is convex on the sub-scanning section. Accordingly, the scanning lens 21 has a negative power in the sub-scanning direction. The negative power of the scanning lens 21 is weaker with decreasing distance from either end (either of the upper end and the lower end) of the scanning lens 21. Meanwhile, each of the scanning lenses 23y, 23m, 23c and 23k has a positive power in the sub-scanning direction. A lens having a negative power in the sub-scanning direction means a lens having a property of causing a light beam to diverge in the sub-scanning direction. A lens having a positive power in the sub-scanning direction means a lens having a property of causing a light beam to converge in the sub-scanning direction.

A part of the light beam By and a part of the light beam Bm entering the scanning lens 21 through the input surface S1 will hereinafter be referred to as light beams Biy and Bim, respectively. A part of the light beam By and a part of the light beam Bm entering the scanning lens 21 through the input surface S1 and exiting the scanning lens 21 through the output surface S2 without being reflected inside the scanning lens 21 will hereinafter be referred to as normal light beams Bny and Bnm, respectively. A part of the light beam Bm entering the scanning lens 21 through the input surface S1 and being reflected by the output surface S2 will hereinafter be referred to as a reflected light beam Br1m. A part of the light beam Bm entering the scanning lens 21 through the input surface S1 and being reflected by the surface S2 and the surface S1 will hereinafter be referred to as a reflected light beam Br2m. A part of the light beam Bm entering the scanning lens 21 through the input surface S1 and exiting the scanning lens 21 through the output surface S2 after being reflected by the surface S2 and the surface S1 will hereinafter be referred to as a ghost light beam Bgm. A part of the light beam By entering the scanning lens 21 through the input surface S1 and exiting the scanning lens 21 through the output surface S2 after being reflected by the surface S2 and the surface S1 will hereinafter be referred to as a ghost light beam Bgy.

As seen in FIG. 3, the light beam By and the light beam Bm enter the scanning lens 21 through the same portion of the input surface S1 and more specifically through a lower portion than the reference surface S. Also, as seen in FIG. 3, the angle θy of the principal ray of the light beam By entering through the input surface S1 to the reference surface S is greater than the angle θm of the principal ray of the light beam Bm entering through the input surface S1 to the reference surface S. The angle of the principal ray of the light beam to the reference surface S means the acute angle between the principal ray and the reference surface S in a side farther in the beam traveling direction. Accordingly, the light beam By enters the scanning lens 21 through the input surface S1, on a lower point than the light beam Bm.

Figure 5:
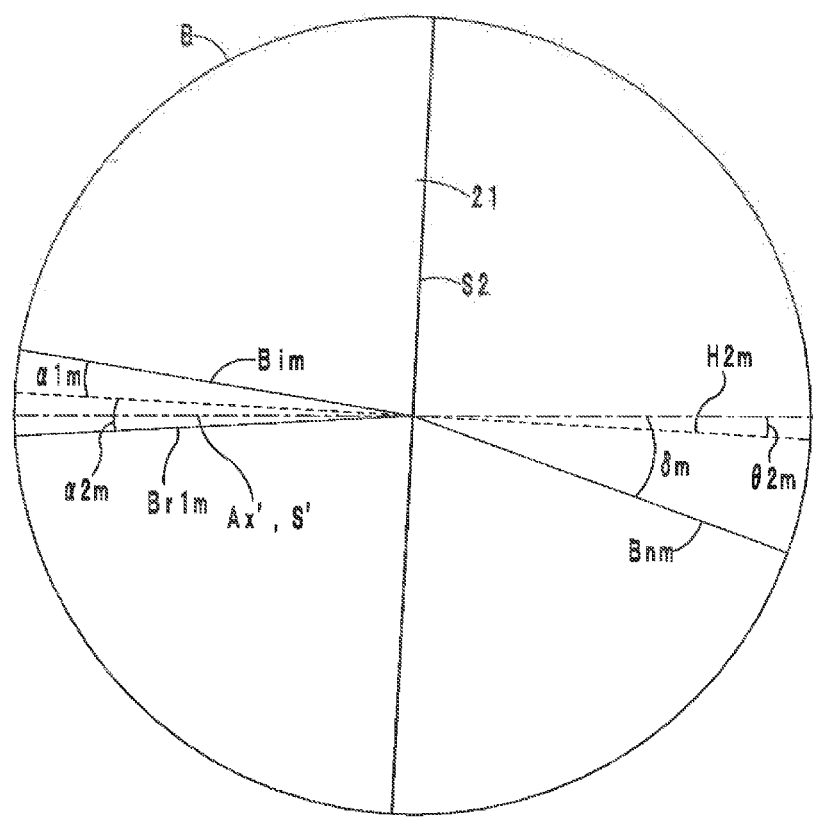
FIG. 5 is a magnified view of the portion B in FIG. 3.
Figure 6:
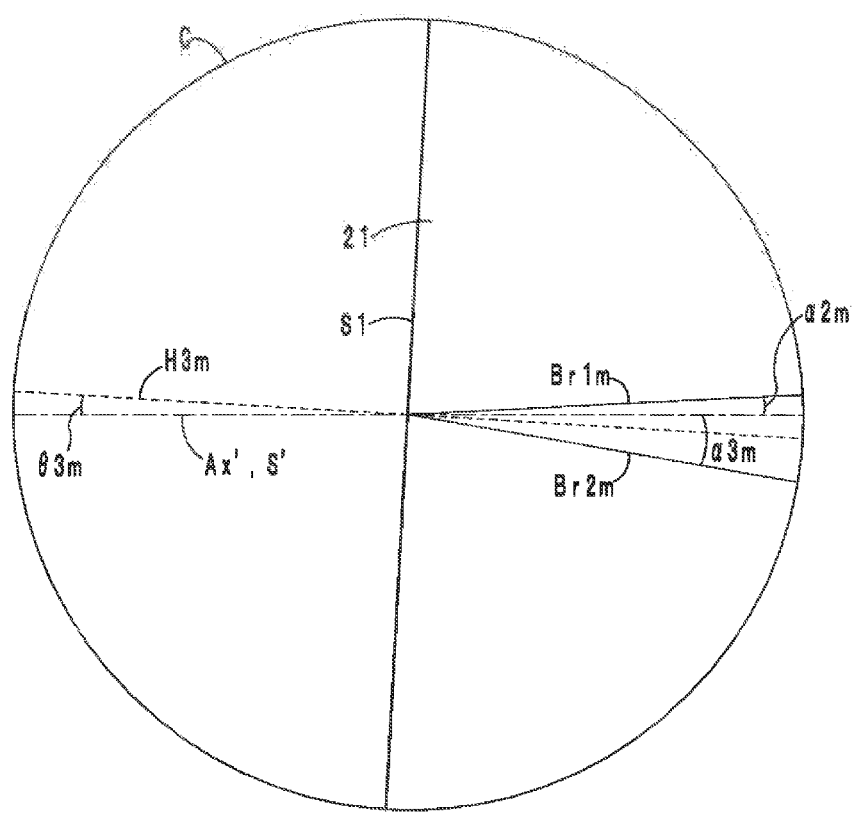
FIG. 6 is a magnified view of the portion C in FIG. 3.
Figure 7:
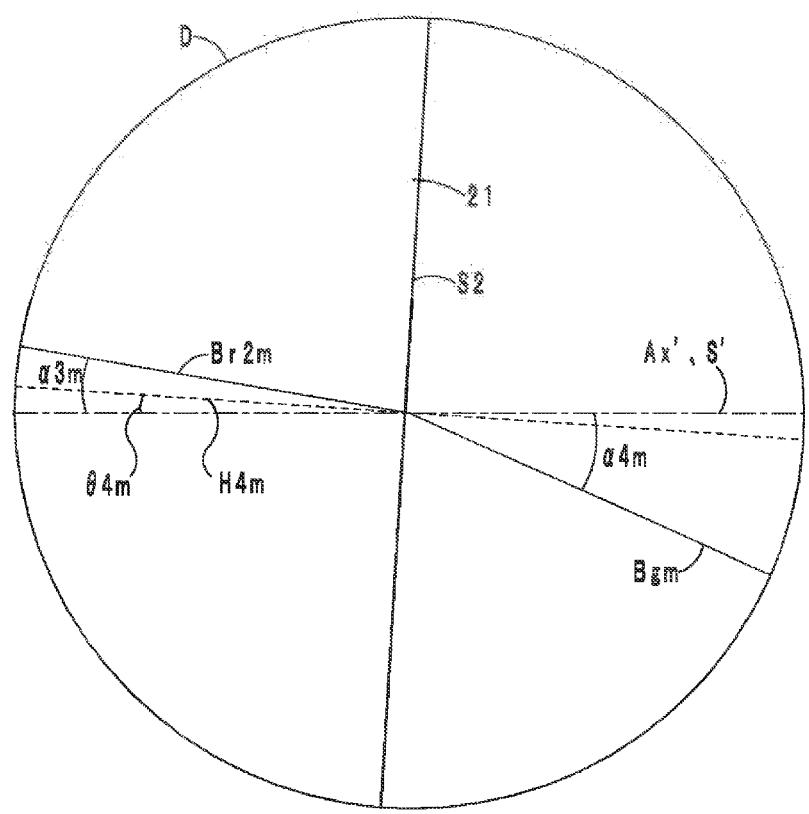
FIG. 7 is a magnified view of the portion D in FIG. 3.
Figure 8:
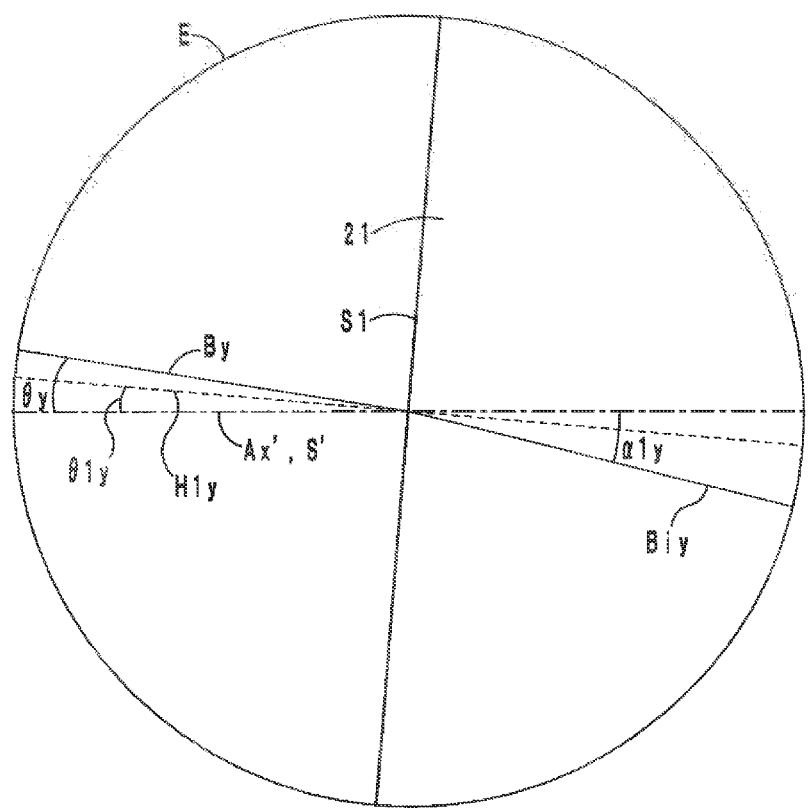
FIG. 8 is a magnified view of the portion E in FIG. 3.
Figure 9:
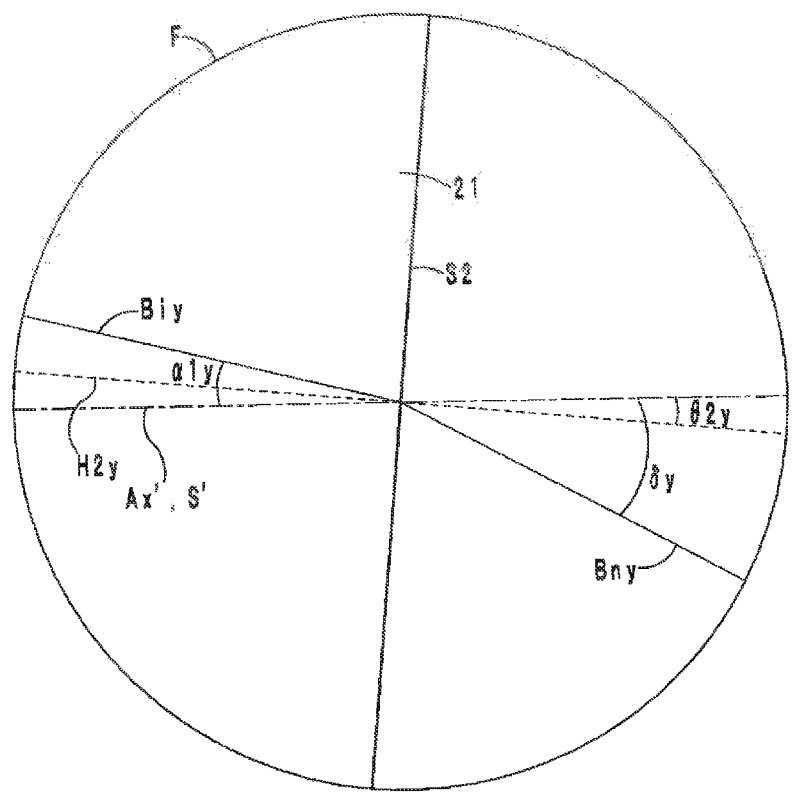
FIG. 9 is a magnified view of the portion F in FIG. 3.

As seen in FIG. 5, the normal light beam Bnm of the light beam Bm makes an angle δm with the reference surface S (surface S'). As seen in FIG. 7, the ghost light beam Bgm of the light beam Bm makes an angle α4m with the reference surface S (surface S'). As seen in FIG. 9, the normal light beam Bny of the light beam By makes an angle δy with the reference surface S (surface S'). The ghost light beam Bgy of the light beam By makes an angle α4y with the reference surface S (surface S'). In FIGS. 4-9, an axis Ax' is indicated as an axis parallel to the axis Ax, and a surface S' is indicated as a surface parallel to the reference surface S.

The scanning lens 21 is designed to meet the following conditions. Specifically, when the light beam Bm and the light beam By entering through points of the input surface S1 at a same position in the main-scanning direction are compared with each other, the angle α4m of the principal ray of the ghost light beam Bgm to the reference surface S is greater than the angle δm of the principal ray of the normal light beam Bnm to the reference surface S and is smaller than the angle δy of the principal ray of the normal light beam Bny to the reference surface S. In sum, the following condition (1) is satisfied.

$$\delta m < \alpha 4m < \delta y \quad (1)$$

Therefore, the ghost light beam Bgm is getting farther away from the normal light beam Bnm as traveling forward. Also, the normal light beam Bny is getting farther away from the ghost light beam Bgm as traveling forward. Therefore, in the optical scanning apparatus 10, the ghost light beam Bgm can be separated from the normal light beams Bnm and Bny. FIGS. 3-9 illustrate the relationship among the angle α4m, the angle δm and the angle δy on the sub-scanning section including the optical axis Ax. The relationship among the angles δm, α4m and δy as illustrated in FIGS. 3-9 is seen on any sub-scanning section at any point of the scanning lens 21 in the main-scanning direction.

The requirements the scanning lens 21 must meet to fulfill the condition (1) will be described below with reference to FIGS. 3-9. Parameters are defined as follows.

The parameter n is the refractive index of the scanning lens 21. The parameter θm is an angle between the reference surface S and the principal ray of the light beam Bm entering the scanning lens 21 through the input surface S1. The parameter θy is an angle between the reference surface S and the principal ray of the light beam By entering the scanning lens 21 through the input surface S1. The parameter θ1m is an angle between the reference surface S and a normal line H1m to the input surface S1 at a point where the principal ray of the light beam Bm is incident on the input surface S1.

The parameter θ2m is an angle between the reference surface S and a normal line H2m to the output surface S2 at a point where the principal ray of the light beam Bim entering the scanning lens 21 through the input surface S1 is incident on the output surface S2. The parameter θ3m is an angle between the reference surface S and a normal line H3m to the input surface S1 at a point where the reflected light beam Brim (the part of light beam Bm entering the scanning lens 21 through the input surface S1 and being reflected by the surface S2) is incident on the surface S1. The parameter θ4m is an angle between the reference surface S and a normal line H4m to the output surface S2 at a point where the reflected light beam Br2m (the part of the light beam Bm entering the scanning lens 21 through the input surface S1 and being reflected by the surface S2 and the surface S1) is incident on the surface S2. The parameter θ1y is an angle between the reference surface S and a normal line H1y to the input surface S1 at a point where the principal ray of the light beam By is incident on the surface S1. The parameter θ2y is an angle between the reference surface S and a normal line H2y to the output surface S2 at a point where the principal ray of the light beam Biy entering the scanning lens 21 through the input surface S1 is incident on the surface S2.

In this regard, according to Snell's law, the relationships expressed by the following expressions (2)-(4) exist. It should be noted that the following approximations were adopted since the values θm, θy, θ1m, θ2m, θ3m, θ4m and θ2y are small: sin θm=θm, sin θy=θy, sin θ1m=θ1m, sin θ2m=θ2m, sin θ3m=θ3m, sin θ4m=θ4m and sin θ2y=θ2y.

$$\delta m = (1-n)\theta 4m + (n-1)\theta 1 + \theta m \quad (2)$$

$$\delta y = (1-n)\theta 4y + (n-1)\theta 1 + \theta y \quad (3)$$

$$\alpha 4m = (1-n)\theta 4m + 2n\theta 3m - 2n\theta 2m + (1-n)\theta 1 + \theta m \quad (4)$$

From the expressions (1)-(4), the following expression (5) can be obtained.

$$0 < 2n(\theta 3m - \theta 2m) < (1-n)(\theta 4y - \theta 4m) + (\theta y - \theta m) \quad (5)$$

Thus, in order to separate the ghost light beam Bgm from the normal light beams Bnm and Bny, the scanning lens 21 shall have a shape meeting the condition (5).

On the sub-scanning section, the angle α4m is greater than the mean value of δm and δy. Accordingly, the following expression (6) is true.

$$\alpha 4m > (\delta m + \delta y)/2 \quad (6)$$

The light beams Bc and Bk are substantially symmetrical to the light beams By and Bm with respect to the reference surface S. Therefore, the light beams Bc and Bk enter through the same portion of the input surface S1 and more specifically through an upper portion than the reference surface S. A part of the light beam Bk and a part of the light beam Bc that entered the scanning lens 21 through the input surface S1 will hereinafter be referred to as light beams Bik and Bic, respectively. A part of the light beam Bk and a part of the light beam Bc entering the scanning lens 21 through the input surface S1 and exiting the scanning lens 21 through the output surface S2 without being reflected inside the scanning lens 21 will hereinafter be referred to as normal light beams Bnk and Bnc, respectively. A part of the light beam Bc entering the scanning lens 21 through the input surface S1 and being reflected by the output surface S2 will hereinafter be referred to as a reflected light beam Br1c. A part of the light beam Bc entering the scanning lens 21 through the input surface S1 and being reflected by the surface S2 and the surface S1 will hereinafter be referred to as a reflected light beam Br2c. A part of the light beam Bc entering the scanning lens 21 through the input surface S1 and exiting the scanning lens 21 through the output surface S2 after being reflected by the surface S2 and the surface S1 will hereinafter be referred to as a ghost light beam Bgc. A part of the light beam Bk entering the scanning lens 21 through the input surface S1 and exiting the scanning lens 21 through the output surface S2 after being reflected by the surface S2 and the surface S1 will hereinafter be referred to as a ghost light beam Bgk.

As seen in FIG. 2, the light beams Bk and Bc enter the scanning lens 21 through a portion of the input surface S1 on the opposite side of the reference surface S from the portion where the beams By and Bm enter. That is, the light beams Bk and Bc enter through an upper portion of the input surface S1. Also, the angle θk of the principal ray of the light beam Bk entering through the input surface S1 to the reference surface S is greater than the angle θc of the principal ray of the light beam Bc entering through the input surface S1 to the reference surface S. Accordingly, the light beam Bk enters through the input surface S1, on an upper point than the beam Bc.

The normal light beam Bnc of the light beam Bc makes an angle δc with the reference surface S (surface S'). The ghost light beam Bgc of the light beam Bc makes an angle α4m with the reference surface S (surface S'). The normal light beam Bnk of the light beam Bk makes an angle δk with the reference surface S (surface S'). The ghost light beam Bgk of the light beam Bk makes an angle α4k with the reference surface S (surface S').

The scanning lens 21 is designed to meet the following conditions. Specifically, when the light beam Bc and the light beam Bk entering through points of the input surface S1 at a same position in the main-scanning direction are compared with each other, the angle α4c of the principal ray of the ghost light beam Bgc to the reference surface S is greater than the angle δc of the principal ray of the normal light beam Bnc to the reference surface S and is smaller than the angle δk of the principal ray of the normal light beam Bnk, which is a part of the light beam Bk, and the reference surface S. In sum, the following condition (7) is satisfied.

$$\delta c < \alpha 4c < \delta k \quad (7)$$

Therefore, the ghost light beam bgc is farther getting away from the normal light beam Bnc as traveling forward. Also, the normal light beam Bnk is getting farther away from the ghost light beam Bgc as traveling forward. Thus, in the optical scanning apparatus 10, the ghost light beam Bgc can be separated from the normal light beams Bnc and Bnk. The relationship among the angle α4c, the angle δc and the angle δk on the sub-scanning section including the optical axis Ax has been described. The relationship among the angles α4m, δc and δk as described above is seen on any sub-scanning section at any point of the scanning lens 21 in the main-scanning direction.

The requirements the scanning lens 21 must meet to fulfill the condition (7) will be described below. Parameters are defined as follows.

The parameter θc is an angle between the reference surface S and the principal ray of the light beam By entering the scanning lens 21 through the input surface S1. The parameter θk is an angle between the reference surface S and the principal ray of the light beam Bk entering the scanning lens 21 through the input surface S1. The parameter θ1c is an angle between the scanning surface S and a normal line H1m to the input surface S1 at a point where the principal ray of the light beam Bc is incident on the input surface S1.

The parameter θ2c is an angle between the reference surface S and a normal line H2c to the output surface S2 at a point where the principal ray of the light beam Bic entering the scanning lens 21 through the input surface S1 is incident on the output surface S2. The parameter θ3c is an angle between the reference surface S and a normal line H3c to the input surface S1 at a point where the reflected light beam Br1c (the part of light beam Bc entering the scanning lens 21 through the input surface S1 and being reflected by the surface S2) is incident on the surface S1. The parameter θ4c is an angle between the reference surface S and a normal line H4c to the output surface S2 at a point where the reflected light beam Br2c (the part of the light beam Bc entering the scanning lens 21 through the input surface S1 and being reflected by the surface S2 and the surface S1) is incident on the surface S2. The parameter θ4k is an angle between the reference surface S and a normal line H2k to the output surface S2 at a point where the principal ray of the light beam Bik entering the scanning lens 21 through the input surface S1 is incident on the output surface S2. The parameter θ1k is an angle between the reference surface S and a normal line H1k to the input surface S1 at a point where the principal ray of the light beam Bk is incident on the input surface S1. The parameter θ2k is an angle between a normal line H2k to the output surface S2 at a point where the principal ray of the light beam Bik entering the scanning lens 21 through the input surface S1 is incident on the output surface S2.

As is the case with the expression (5) above, the following expression (8) can be obtained. The expression (8) is derived in the same way as the expression (5), and a detailed description thereof is omitted.

$$0 < 2n(\theta 3c - \theta 2c) < (1-n)(\theta 4k - \theta 4k) + (\theta k - \theta c) \quad (8)$$

Thus, in order to separate the ghost light beam Bgc from the normal light beams Bnc and Bnk, the scanning lens 21 shall have a shape meeting the condition (8).

The angle α4c is greater than the mean value of δc and δk. Accordingly, the following expression (9) is true.

$$\alpha 4c > (\delta c + \delta k)/2 \quad (9)$$

Figure 10:
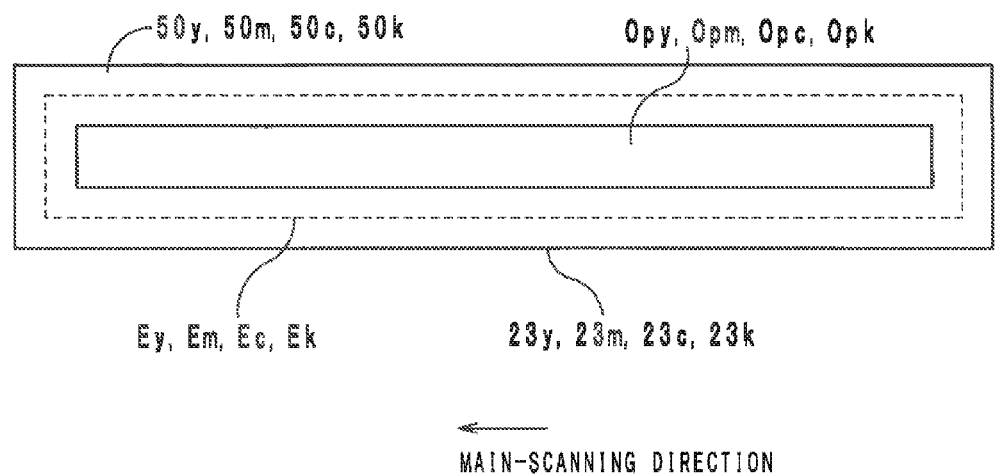
FIG. 10 is a view of scanning lenses 23y, 23m, 23c and 23k, and preventive members 50y, 50m, 50c and 50k.
Figure 11:
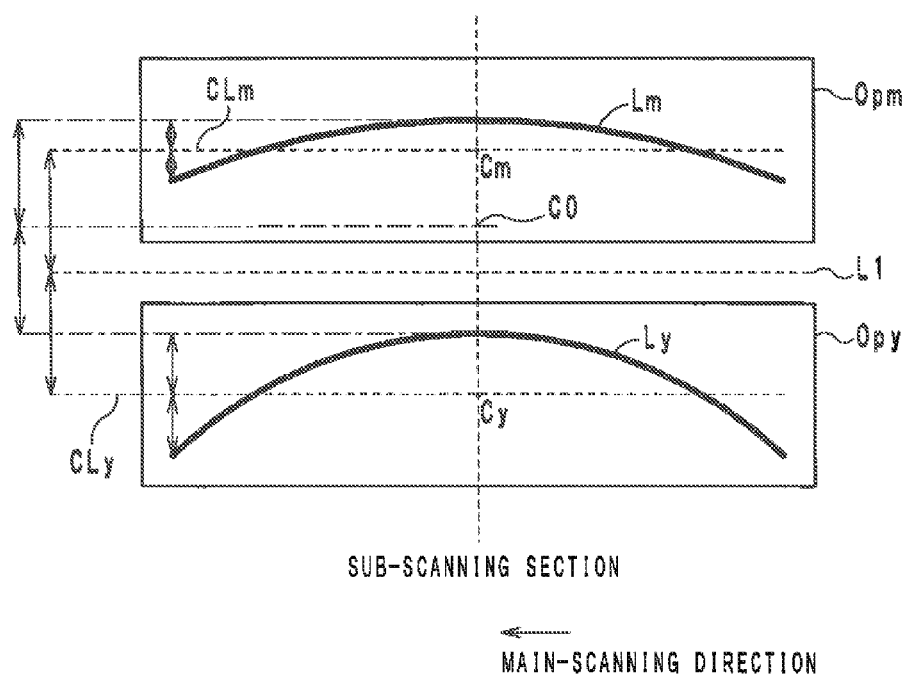
FIG. 11 is a view indicating the positional relationship between an opening Opy and an opening Opm.

The preventive members 50y, 50m, 50c and 50k are provided to prevent the ghost light beams from reaching the photoreceptor drums 40y, 40m, 40c and 40k. The structures of the preventive members 50y, 50m, 50c and 50k will hereinafter be described with reference to the drawings. FIG. 10 illustrates the scanning lenses 23Y, 23m, 23c and 23k, and the preventive members 50y, 50m, 50c and 50k. FIG. 11 indicates the positional relationship between an opening Opy and an opening Opm.

As seen in FIG. 2, the preventive members 50y, 50m, 50c and 50k are located downstream from the scanning lens 21 in the traveling directions of the light beams By, Bm, Bc and Bk, respectively, and more specifically, downstream from the scanning lenses 23y, 23m, 23c and 23k in the traveling directions of the light beams By, Bm, Bc and Bk, respectively. In this embodiment, the preventive members 50y, 50m, 50c and 50k are in contact with the scanning lenses 23y, 23m, 23c and 23k, respectively.

As illustrated in FIG. 10, the preventive members 50y, 50m, 50c and 50k extend in the main-scanning direction and have openings Opy, Opm, Opc and Opk, respectively. The openings Opy, Opm, Opc and Opk have the same shape. The openings Opy, Opm, Opc and Opk overlap mirror surface portions Ey, Em, Ec and Ek of the scanning lenses 23y, 23m, 23c and 23k, respectively. The mirror surface portions Ey, Em, Ec and Ek are free-form surfaces or light transmissive surfaces. Therefore, the openings Opy, Opm, Opc and Opk are arranged and designed such that the normal light beams Bny, Bnm, Bnc and Bnk can pass therethrough.

As seen in FIG. 10, the openings Opy, Opm, Opc and Opk are smaller than the mirror surface portions Ey, Em, Ec and Ek, respectively, and fit within the mirror surface portions Ey, Em, Ec and Ek, respectively. Accordingly, the preventive member 50y prevents light beams other than the normal light beam Bny from exiting from the scanning lens 23y, which is located most downstream in the traveling direction of the normal light beam Bny. The preventive member 50m prevents light beams other than the normal light beam Bnm from exiting from the scanning lens 23m, which is located most downstream in the traveling direction of the normal light beam Bnm. The preventive member 50c prevents light beams other than the normal light beam Bnc from exiting from the scanning lens 23c, which is located most downstream in the traveling direction of the normal light beam Bnc. The preventive member 50k prevents light beams other than the normal light beam Bnk from exiting from the scanning lens 23k, which is located most downstream in the traveling direction of the normal light beam Bnk. Thus, the preventive members 50y, 50m, 50c and 50k prevent the ghost light beams from reaching the photoreceptor drums 40y, 40m, 40c and 40k, respectively.

The relationship between the opening Opy and the opening Opm will hereinafter be described with reference to FIG. 11. The curved lines Ly and Lm in FIG. 11 indicate paths of the normal light beams Bny and Bnm, respectively.

As mentioned above, the openings Opy, Opm, Opc and Opk are arranged and designed such that the normal light beams Bny, Bnm, Bnc and Bnk can pass therethrough. Accordingly, the paths Ly and Lm are within the openings Opy and Opm, respectively. The centroid Cy of the opening Opy is located on the center CLy of the path Ly with respect to the sub-scanning direction, and the centroid Cm of the opening Opm is located on the center CLm of the path Lm with respect to the sub-scanning direction. The openings Opk and Opc have the same relationship with each other as in the case with the openings Opy and Opm.

Effects

With the optical scanning apparatus 10, the risk of formation of a ghost image can be reduced or eliminated. More specifically, since the condition (1) is met, the ghost light beam Bgm gets farther away from the normal light beam Bnm as traveling forward. Further, the normal light beam Bny gets farther away from the ghost light beam Bgm as traveling forward. Accordingly, the ghost light beam Bgm can be separated from the normal light beams Bnm and Bny. Therefore, it is possible to eliminate the ghost light beam Bgm easily within the paths from the scanning lens 21 to the photoreceptor drums 40y and 40m. Consequently, the risk of formation of a ghost image by the ghost light beam Bgm can be reduced or eliminated. For the same reason, the risk of formation of a ghost image by the ghost light beam Bgc can be reduced or eliminated.

With the optical scanning apparatus 10, bad effects of an increase in the negative power of the scanning lens 21 on the normal light beams Bny, Bnm, Bnc and Bnk, such as bow, distortion, etc., can be reduced. A possible way of reducing or eliminating the risk of formation of a ghost image is, for example, changing the traveling direction of the ghost light beam Bgm greatly downward by use of the scanning lens 21 so as to cause the ghost light beam Bgm to travel below the normal light beam Bny. In this case, however, the scanning lens 21 must have so great a negative power as to cause significant bad effects on the normal light beams Bny, Bnm, Bnc and Bnk, such as bow, distortion, etc.

In the optical scanning apparatus 10, the ghost light beam Bgm travels between the normal light beams Bnm and Bny with respect to the sub-scanning direction. In other words, the scanning lens 21 does not change the traveling direction of the ghost light beam Bgm downward so greatly. Therefore, the scanning lens 21 does not need to have so great a negative power. Consequently, the bad effects on the normal light beams Bny, Bnm, Bnc and Bnk, such as bow, distortion, etc. can be reduced. The same also applies to the ghost light beam Bgc.

In the optical scanning apparatus 10, since the ghost light beam Bgm travels between the normal light beams Bnm and Bny with respect to the sub-scanning direction, it may be impossible to eliminate the ghost light beam Bgm completely. However, even in a case in which the ghost light beam Bgm cannot be eliminated completely, with the optical scanning apparatus 10, there is almost no possibility that electrostatic latent images formed on the photoreceptor drums 40y and 40m would have a significant problem. The reason is described below. A ghost image would bring about bad effects on the electrostatic latent images formed on the photoreceptor drums 40y and 40k since the energy of the ghost light beam Bgm is accumulated during repetitions of deflection thereof. However, in a case in which the scanning lens 21 has a refractive index of about 1.5 and in which the ghost light beam is incident on the surfaces S1 and S2 at an incident angle of 0 degrees to 20 degrees, the reflectance of each of the surfaces S1 and S2 is about 5%. Since the ghost light beam Bgm is reflected by the surface S1 once and by the surface S2 once (that is, reflected twice), the energy of the ghost light beam Bgm is about 0.25% of the energy of the normal light beam Bnm, and the energy of the ghost light beam Bgm is very low. Therefore, by cutting the ghost light beam Bgm at a certain rate, which may not result in complete elimination of the ghost light beam Bgm, the bad effects on the electrostatic latent images can be reduced enough. This also applied to the ghost light beam Bgc.

With the optical scanning apparatus 10, the ghost light beam Bgm can be eliminated easily. More specifically, the centroid Cy of the opening Opy is on the center CLy of the path Ly with respect to the sub-scanning direction, and the centroid Cm of the opening Opm is on the center CLm of the path Lm with respect to the sub-scanning direction. Thus, the paths Ly and Lm are located around the centers of the openings Opy and Opm, respectively. In order to reduce the cost, the preventive members 50y and 50m have the same structure, and accordingly, the openings Opy and Opm have the same shape.

In this regard, as seen in FIG. 11, bow occurs in the normal light beams Bnm and Bny, and each of the paths Ly and Lm is like a bow protruding upward. The normal light beams Bnm and Bny pass through the scanning lens 21, in portions below the reference surface S, and the point where the normal light beam Bny passes is farther downward from the reference surface S than the point where the normal light beam Bnm passes. Accordingly, the bow of the normal light beam Bny is greater than the bow of the normal light beam Bnm, that is, the path Ly curves more greatly than the path Lm. The median C0 between the paths Ly and Lm on the sub-scanning section is located above the perpendicular bisector L1 of a line between the centroids Cy and Cm. On the sub-scanning section, if the ghost light beam Bgm travels on the middle point between the normal light beams Bnm and Bny, the ghost light beam Bgm passes through a portion closer to the opening Opm than the opening Opy. From the viewpoint of elimination of the ghost light beam Bgm, it is preferred that the ghost light beam Bgm passes through a portion around the perpendicular bisector L1.

For this purpose, in the optical scanning apparatus 10, the condition (6) is fulfilled. Thereby, the ghost light beam Bgm passes through a portion below the median C0 and passes through a portion around the perpendicular bisector L1. Consequently, the preventive members 50y and 50m prevent the ghost light beam Bgm from reaching the photoreceptor drums 40y and 40m. Thus, the optical scanning apparatus 10 can eliminate the ghost light beam Bgm easily. For the same reason, the ghost light beam Bgc can be eliminated easily.

The optical scanning apparatus 10 can separate the ghost light beam Bgm from the normal light beams Bny and Bnm easily while reducing the bad effects of aberrations on the normal light beam Bny. Specifically, if the negative power of the scanning lens 21 is uniform in the sub-scanning direction, the following problem will occur. If the negative power of the scanning lens 21 is set to such a value to change the traveling direction of the ghost light beam Bgm downward, the negative power of the scanning lens 21 acting on the normal light beam Bny, which passes through the scanning lens 21, in a portion below the ghost light beam Bgm, will be too large, and accordingly, the normal light beam Bny will be under the effect of aberrations. Thus, if the negative power of the scanning lens 21 is uniform in the sub-scanning direction, it is not possible to reduce the bad effects of aberrations on the normal light beam Bny though it is possible to separate the ghost light beam Bgm from the normal light beams Bny and Bnm easily.

In order to avoid this trouble, in the optical scanning apparatus 10, the negative power of the scanning lens 21 is weaker with decreasing distance from either end of the scanning lens 21 in the sub-scanning direction. Therefore, the negative power of the scanning lens 21 at the point where the ghost light beam Bgm passes is large enough to change the traveling direction of the ghost light beam Bgm downward, thereby facilitating separation of the ghost light beam Bgm from the normal light beams Bny and Bnm. Also, it is possible to moderate the negative power of the scanning lens 21 at the point where the normal light beam Bny passes, thereby reducing the risk that the negative power of the scanning lens 21 acting on the normal light beam Bny would be too large. Accordingly, it is possible to prevent the bad effects of aberrations from acting on the normal light beam Bny.

The optical scanning apparatus 10 can eliminate the ghost light beam Bgm more effectively for the following reason. The scanning lens 21 has a negative power, and also, the condition (1) is fulfilled. Accordingly, the ghost light beam Bgm that passed through the scanning lens 21 gets farther away from the normal light beam Bnm as travelling forward. On the other hand, the scanning lens 23m has a positive power, and accordingly, the ghost light beam Bgm that passed through the scanning lens 23m gets closer to the normal light beam Bnm as travelling forward. Therefore, the point where the ghost light beam Bgm is the farthest from the normal light beam Bnm is a point immediately before or immediately after the scanning lens 23m, and it is easy to eliminate the ghost light beam Bgm around the scanning lens 23m. For this reason, in the optical scanning apparatus 10, the preventive member 50m is in contact with the scanning lens 23m that is located most downstream in the traveling direction of the normal light beam Bnm. Accordingly, the preventive member 50m eliminates the ghost light beam Bgm.

The scanning lens 21 has a negative power, and also, the condition (1) is fulfilled. Accordingly, the ghost light beam Bgm that passed through the scanning lens 21 gets farther away from the normal light beam Bny as travelling forward. On the other hand, the scanning lens 23y has a positive power, and accordingly, the ghost light beam Bgm that passed through the scanning lens 23y gets closer to the normal light beam Bny as travelling forward. Therefore, the point where the ghost light beam Bgm is the farthest from the normal light beam Bny is a point immediately before or immediately after the scanning lens 23y, and it is easy to eliminate the ghost light beam Bgm around the scanning lens 23y. For this reason, in the optical scanning apparatus 10, the preventive member 50y is in contact with the scanning lens 23y that is located most downstream in the traveling direction of the normal light beam Bny. Accordingly, the preventive member 50y eliminates the ghost light beam Bgm. In the same way, the preventive members 50c and 50k eliminate the ghost light beam Bgc.

The light beam By used for formation of an electrostatic latent image for a yellow image travels below the light beam Bm, that is, travels lowest among the light beams By, Bm, Bc and Bk. Therefore, there is a possibility that the ghost light beam Bgm would overlap the normal light beam Bny, thereby causing a ghost image on the electrostatic latent image for a yellow image. However, a change in density of yellow is the least recognizable to human eyes as compared to changes in density of magenta, cyan and black. Therefore, even if the ghost light beam Bgm forms a ghost image on the electrostatic latent image for a yellow image, users will not recognize the ghost image in most cases.

On the other hand, a change in density of black is the most recognizable to human eyes as compared to changes in density of yellow, magenta and cyan. Also, the frequency of use of black is high as compared to the frequencies of use of yellow, magenta and cyan. Therefore, it is very important to prevent a ghost image on an electrostatic latent image for a black image. For this reason, the bam Bk used for formation of an electrostatic latent image for a black image travels above the light beam Bc, that is, travels uppermost among the light beams By, Bm, Bc and Bk. Therefore, it is possible to change the traveling direction of the ghost light beam Bgk upward greatly. Accordingly, it is possible to separate the ghost light beam Bgk greatly from the normal light beam Bnk, thereby, facilitating elimination of the ghost light beam Bgk. Thus, a ghost image on an electrostatic latent image for a black image can be prevented from being formed by the ghost light beam Bgk.

First Example

The scanning lens 21 of a first exemplary optical scanning apparatus 10 will be hereinafter described. Table 1 and Table 2 indicate the coefficients of the free-form surfaces S1 and S2, respectively, of the scanning lens 21. The free-form surface shape is expressed by the following expression (10). On a sub-scanning section, the surface S1 is concave, and the surface S2 is plane.

$$X = \sum_i \sum_j A_{ij} \bullet Y^i \bullet Z^j \qquad (10)$$

TABLE 1

| | Aij | Z=0 | Z=1 | Z=2 | Z=3 | Z=4 |
|---|---|---|---|---|---|---|
| Y | 0 | 0.000000E+00 | 0.000000E+00 | −4.000000E−03 | 0.000000E+00 | 2.000000E−05 |
| | 1 | 0.000000E+00 | 0.000000E+00 | 0.000000E+00 | 0.000000E+00 | 0.000000E+00 |
| | 2 | −5.035993E−03 | 0.000000E+00 | 0.000000E+00 | 0.000000E+00 | 0.000000E+00 |
| | 3 | 0.000000E+00 | 0.000000E+00 | 0.000000E+00 | 0.000000E+00 | 0.000000E+00 |
| | 4 | −2.037561E−07 | 0.000000E+00 | 0.000000E+00 | 0.000000E+00 | 0.000000E+00 |
| | 5 | 0.000000E+00 | 0.000000E+00 | 0.000000E+00 | 0.000000E+00 | 0.000000E+00 |
| | 6 | −1.894076E−10 | 0.000000E+00 | 0.000000E+00 | 0.000000E+00 | 0.000000E+00 |
| | 7 | 0.000000E+00 | 0.000000E+00 | 0.000000E+00 | 0.000000E+00 | 0.000000E+00 |
| | 8 | 3.456800E−13 | 0.000000E+00 | 0.000000E+00 | 0.000000E+00 | 0.000000E+00 |
| | 9 | 0.000000E+00 | 0.000000E+00 | 0.000000E+00 | 0.000000E+00 | 0.000000E+00 |
| | 10 | −2.279323E−16 | 0.000000E+00 | 0.000000E+00 | 0.000000E+00 | 0.000000E+00 |

TABLE 2

| | Aij | Z=0 | Z=1 | Z=2 |
|---|---|---|---|---|
| Y | 0 | 0.000000E+00 | 0.000000E+00 | 0.000000E+00 |
| | 1 | 0.000000E+00 | 0.000000E+00 | 0.000000E+00 |
| | 2 | −7.593877E−03 | 0.000000E+00 | −2.549623E−08 |
| | 3 | 0.000000E+00 | 0.000000E+00 | 0.000000E+00 |
| | 4 | −3.907634E−07 | 0.000000E+00 | −1.536072E−09 |
| | 5 | 0.000000E+00 | 0.000000E+00 | 0.000000E+00 |
| | 6 | −1.956004E−10 | 0.000000E+00 | 4.729620E−12 |
| | 7 | 0.000000E+00 | 0.000000E+00 | 0.000000E+00 |
| | 8 | 1.156922E−13 | 0.000000E+00 | −6.894269E−15 |
| | 9 | 0.000000E+00 | 0.000000E+00 | 0.000000E+00 |
| | 10 | −6.597682E−17 | 0.000000E+00 | 4.216011E−18 |

With the scanning lens 21, δm, δy, (δm+δy)/2 and α4m are as indicated in Table 3.

TABLE 3

| | |
|---|---|
| δm | 0.85 |
| δy | 2.55 |
| (δm + δy/2 | 1.70 |
| α4m | 1.72 |

As is clear from Table 3, the first exemplary optical scanning apparatus 10 fulfills the conditions expressed by the inequalities (1) and (6). Table 4 indicates other angles of the normal light beams Bnm and Bny, and Table 5 indicates other angles of the ghost light beams Bgm and Bgy.

TABLE 4

| | Bnm | | Bny |
|---|---|---|---|
| n | 1.5722 | n | 1.5722 |
| θm | 0.73 | θy | 2.18 |
| θ1m | 0.22 | θ1y | 0.65 |
| α1m | 0.54 | α1y | 1.62 |
| θ2m | 0.00 | θ2y | 0.00 |
| δm | 0.85 | δy | 2.55 |

TABLE 5

| | Bgm | | Bgy |
|---|---|---|---|
| n | 1.5722 | n | 1.5722 |
| θm | 0.73 | θy | 2.18 |
| θ1m | 0.22 | θ1y | 0.65 |
| α1m | 0.54 | α1y | 1.62 |
| θ2m | 0.00 | θ2y | 0.00 |
| α2m | −0.54 | α2y | −1.62 |
| θ3m | 0.28 | θ3y | 0.80 |
| α3m | 1.09 | α3y | 3.23 |
| θ4m | 0.00 | θ4y | 0.00 |
| α4m | 1.72 | α4y | 5.08 |

Since the surface S2 is a plane surface, normal lines to the surface S2 are parallel to the optical axis Ax. Therefore, the angles θ2m and θ2y of the normal light beams Bnm and Bny are zero. The wavelengths of the light beams By, Bm, Bc and Bk emitted from the light sources 11y, 11m, 11c and 11k respectively are 780 nm. The refractive indices n indicated in the tables above are the refractive indices to light having a wavelength of 780 nm. Under the conditions above, the members of the inequality (5) are as indicated in Table 6.

TABLE 6

| | |
|---|---|
| 2n(θ3m − θ2m) | 0.87 |
| (1 − n)(θ4y − θ4m) + (θy − θm) | 1.46 |

As is clear from Table 6, the first exemplary optical scanning apparatus 10 fulfills the condition expressed by the inequality (5).

Referring to Table 2, which shows the coefficients of the free-form surface S2, the coefficient at $Y^0$ and $Z^0$, the coefficient at $Y^0$ and $Z^1$ and the coefficient at $Y^0$ and $Z^2$ are all zero. This shows that the surface S2 is a plane surface. Referring to Table 1, which shows the coefficients of the free-form surface S1, the coefficient at $Y^0$ and $Z^2$ is −4 E-3, and the coefficient at $Y^0$ and $Z^4$ is 2 E-5. This shows that the curvature of the surface S1 is smaller with increasing distance from the optical axis Ax and with decreasing distance from the upper side or the lower side. This means that the negative power of the scanning lens 21 decreases with increasing distance from the optical axis Ax and with decreasing distance from the upper side or the lower side.

Since the surface S2 is plane on a sub-scanning section, the scanning lens 21 has only weak sensitivity to the eccentricity in the sub-scanning direction of a surface.

Second Example

The scanning lens 21 of a second exemplary optical scanning apparatus 10 will hereinafter be described. Table 7 and Table 8 indicate the coefficients of the free-form surfaces S1 and S2, respectively, of the scanning lens 21. On a sub-scanning section, the surface S1 is concave, and the surface S2 is convex.

TABLE 7

| | | | Z | | | |
|---|---|---|---|---|---|---|
| Aij | | 0 | 1 | 2 | 3 | 4 |
| Y | 0 | 0.000000E+00 | 0.000000E+00 | −6.000000E−03 | 0.000000E+00 | 2.500000E−05 |
| | 1 | 0.000000E+00 | 0.000000E+00 | 0.000000E+00 | 0.000000E+00 | 0.000000E+00 |
| | 2 | −5.036428E−03 | 0.000000E+00 | 0.000000E+00 | 0.000000E+00 | 0.000000E+00 |
| | 3 | 0.000000E+00 | 0.000000E+00 | 0.000000E+00 | 0.000000E+00 | 0.000000E+00 |
| | 4 | −2.036106E−07 | 0.000000E+00 | 0.000000E+00 | 0.000000E+00 | 0.000000E+00 |
| | 5 | 0.000000E+00 | 0.000000E+00 | 0.000000E+00 | 0.000000E+00 | 0.000000E+00 |
| | 6 | −1.890816E−10 | 0.000000E+00 | 0.000000E+00 | 0.000000E+00 | 0.000000E+00 |
| | 7 | 0.000000E+00 | 0.000000E+00 | 0.000000E+00 | 0.000000E+00 | 0.000000E+00 |
| | 8 | 3.445465E−13 | 0.000000E+00 | 0.000000E+00 | 0.000000E+00 | 0.000000E+00 |
| | 9 | 0.000000E+00 | 0.000000E+00 | 0.000000E+00 | 0.000000E+00 | 0.000000E+00 |
| | 10 | −2.270189E−16 | 0.000000E+00 | 0.000000E+00 | 0.000000E+00 | 0.000000E+00 |

TABLE 8

| | | | Z | |
|---|---|---|---|---|
| Aij | | 0 | 1 | 2 |
| Y | 0 | 0.000000E+00 | 0.000000E+00 | −1.000000E−03 |
| | 1 | 0.000000E+00 | 0.000000E+00 | 0.000000E+00 |
| | 2 | −7.593945E−03 | 0.000000E+00 | −1.120342E−07 |
| | 3 | 0.000000E+00 | 0.000000E+00 | 0.000000E+00 |
| | 4 | −3.901517E−07 | 0.000000E+00 | −1.747738E−09 |
| | 5 | 0.000000E+00 | 0.000000E+00 | 0.000000E+00 |
| | 6 | −1.967556E−10 | 0.000000E+00 | 5.468468E−12 |
| | 7 | 0.000000E+00 | 0.000000E+00 | 0.000000E+00 |
| | 8 | 1.172983E−13 | 0.000000E+00 | −8.096617E−15 |
| | 9 | 0.000000E+00 | 0.000000E+00 | 0.000000E+00 |
| | 10 | −6.710575E−17 | 0.000000E+00 | 5.043798E−18 |

With the scanning lens 21, δm, δy, (δm+δy)/2 and α4m are as indicated in Table 9.

TABLE 9

| | |
|---|---|
| δm | 0.88 |
| δy | 2.63 |
| (δm + δy/2 | 1.76 |
| α4m | 1.96 |

As is clear from Table 9, the second exemplary optical scanning apparatus 10 fulfills the conditions expressed by the inequalities (1) and (6). Table 10 indicates other angles of the normal light beams Bnm and Bny, and Table 11 indicates other angles of the ghost light beams Bgm and Bgy.

TABLE 10

|  | Bnm |  | Bny |
|---|---|---|---|
| n | 1.5722 | n | 1.5722 |
| θm | 0.73 | θy | 2.18 |
| θ1m | 0.33 | θ1y | 0.97 |
| α1m | 0.58 | α1y | 1.74 |
| θ2m | 0.06 | θ2y | 0.19 |
| δm | 0.88 | δy | 2.63 |

TABLE 11

|  | Bgm |  | Bgy |
|---|---|---|---|
| n | 1.5722 | n | 1.5722 |
| θm | 0.73 | θy | 2.18 |
| θ1m | 0.33 | θ1y | 0.97 |
| α1m | 0.58 | α1y | 1.74 |
| θ2m | 0.06 | θ2y | 0.19 |
| α2m | −0.46 | α2y | −1.37 |
| θ3m | 0.41 | θ3y | 1.20 |
| α3m | 1.28 | α3y | 3.77 |
| θ4m | 0.09 | θ4y | 0.25 |
| α4m | 1.96 | α4y | 5.78 |

Under the conditions above, the members of the inequality (5) are as indicated in Table 12.

TABLE 12

| 2n(θ3m − θ2m) | 1.09 |
|---|---|
| (1 − n)(θ4y − θ4m) + (θy − θm) | 1.36 |

As is clear from Table 12, the second exemplary optical scanning apparatus 10 fulfills the condition expressed by the inequality (5).

Referring to Table 8, which shows the coefficients of the free-form surface S2, the coefficient at $Y^0$ and $Z^2$ is −1 E-3. This shows that the surface S2 is spherical on a sub-scanning section. Referring to Table 7, which shows the coefficients of the free-form surface S1, the coefficient at $Y^0$ and $Z^2$ is −6 E-3, and the coefficient at $Y^0$ and $Z^4$ is 2.5 E-5. This shows that the curvature of the surface S1 is smaller with increasing distance from the optical axis Ax and with decreasing distance from the upper side or the lower side. This means that the negative power of the scanning lens 21 decreases with increasing distance from the optical axis Ax and with decreasing distance from the upper side or the lower side.

Other Embodiments

Optical scanning apparatuses according to the present invention are not limited to the embodiment and the examples above.

In the embodiment and the examples described above, the preventive members 50y, 50m, 50c and 50k are provided downstream from the scanning lenses 23y, 23m, 23c and 23k in the traveling directions of the normal light beams Bny, Bnm, Bnc and Bnk, respectively. However, the preventive members 50y, 50m, 50c and 50k may be provided upstream from the scanning lenses 23y, 23m, 23c and 23k in the traveling directions of the normal light beams Bny, Bnm, Bnc and Bnk, respectively. In this case, the preventive member 50y can prevent light beams other than the normal light beam Bny from entering the scanning lens 23y that is located most downstream in the traveling direction of the normal light beam Bny. The preventive member 50m can prevent light beams other than the normal light beam Bnm from entering the scanning lens 23m that is located most downstream in the traveling direction of the normal light beam Bnm. The preventive member 50c can prevent light beams other than the normal light beam Bnc from entering the scanning lens 23c that is located most downstream in the traveling direction of the normal light beam Bnc. The preventive member 50k can prevent light beams other than the normal light beam Bnk from entering the scanning lens 23k that is located most downstream in the traveling direction of the normal light beam Bnk.

In addition to the scanning lenses 21, 23y, 23m, 23c and 23k, other scanning lenses may be provided.

The preventive members 50y, 50m, 50c and 50k do not always need to be provided.

Although the present invention has been described in connection with the embodiments above, it is to be noted that various changes and modifications may be obvious to those who are skilled in the art. Such changes and modifications are to be understood as being within the scope of the invention.

What is claimed is:

1. An optical scanning apparatus comprising:
 a light source configured to emit a plurality of light beams including a first light beam and a second light beam;
 a deflector configured to deflect the plurality of light beams in a main-scanning direction; and
 a scanning optical element group configured to focus the deflected light beams on a plurality of surfaces to be scanned, wherein:
 the scanning optical element group includes a first scanning optical element having an input surface and an output surface and having a negative power in a sub-scanning direction, the plurality of light beams entering the first scanning optical element through the input surface and exiting the first scanning optical element through the output surface;
 the first light beam and the second light beam enter the first scanning optical element through points of the input surface on a same side of a reference surface including an optical axis of the first scanning optical element and being parallel to the main-scanning direction;
 when the first light beam and the second light beam entering through points of the incident surface located at a same position in the main-scanning direction are compared with each other, an angle between the reference surface and a principal ray of the second light beam is greater than an angle between the reference surface and a principal ray of the first light beam; and
 when the first light beam and the second light beam entering through points of the incident surface located at a same position in the main-scanning direction are compared with each other, a first angle between the reference surface and a principal ray of a first ghost light beam is greater than a second angle between the reference surface and a principal ray of a first normal light beam and is smaller than a third angle between the reference surface and a principal ray of a second normal light beam, the first ghost light beam being a part of the first light beam exiting through the output surface after being reflected by the output surface and the input surface, the first normal light beam being another part of the first light beam exiting through the output surface without being reflected by either of the input surface and the output surface, the second normal light beam being a part of the second light beam exiting through the output surface without being reflected by either of the input surface and the output surface.

2. The optical scanning apparatus according to claim 1, wherein on a sub-scanning section including the optical axis of the first scanning optical element and being parallel to the sub-scanning direction, the first angle is greater than a mean value of the second angle and the third angle.

3. The optical scanning apparatus according to claim 2, further comprising:
  a first preventive member provided downstream from the first scanning optical element in a traveling direction of the first light beam and having a first opening extending in the main-scanning direction; and
  a second preventive member provided downstream from the first scanning optical element in a traveling direction of the second light beam and having a second opening extending in the main-scanning direction, wherein:
  a first centroid of the first opening is located on a first center, with respect to the sub-scanning direction, of a path of the first normal light beam on the first opening;
  a second centroid of the second opening is located on a second center, with respect to the sub-scanning direction, of a path of the second normal light beam on the second opening;
  the first opening is configured to permit the first normal light beam to pass therethrough; and
  the second opening is configured to permit the second normal light beam to pass therethrough.

4. The scanning optical apparatus according to claim 3, further comprising one or more second scanning optical elements provided downstream from the first scanning optical element in the traveling direction of the first light beam, wherein:
  the first preventive member prevents light beams other than the first normal light beam from entering the second scanning optical element provided most downstream in the traveling direction of the first normal light beam or prevents light beams other than the first normal light beam from exiting the second scanning optical element provided most downstream in the traveling direction of the first normal light beam.

5. The optical scanning apparatus according to claim 4, wherein the first preventive member is in contact with the second optical scanning member provided most downstream in the traveling direction of the first normal light beam.

6. The optical scanning apparatus according to claim 3, further comprising one or more third scanning optical elements provided downstream from the first scanning optical element in the traveling direction of the second light beam, wherein:
  the second preventive member prevents light beams other than the second normal light beam from entering the third scanning optical element provided most downstream in the traveling direction of the second normal light beam or prevents light beams other than the second normal light beam from exiting the third scanning optical element provided most downstream in the traveling direction of the second normal light beam.

7. The optical scanning apparatus according to claim 6, wherein the second preventive member is in contact with the third optical scanning member provided most downstream in the traveling direction of the second normal light beam.

8. The optical scanning apparatus according to claim 3, wherein the first opening and the second opening have a same shape.

9. The optical scanning apparatus according to claim 1, wherein the negative power of the first scanning optical element decreases with decreasing distance from either end of the first scanning optical element in the sub-scanning direction.

10. The optical scanning apparatus according to claim 1, wherein:
  on a sub-scanning section including the optical axis of the first scanning optical element and being parallel to the sub-scanning direction, the input surface is concave; and
  on the sub-scanning section, the output surface is plane.

11. The optical scanning apparatus according to claim 1, wherein the light source emits a third light beam and a fourth light beam as well as the first light beam and the second light beam.

12. The optical scanning apparatus according to claim 11, wherein:
  the first light beam, the third light beam and the fourth light beam are used to form an electrostatic latent image for a magenta image, an electrostatic latent image for a cyan image and an electrostatic latent image for a black image on three of the surfaces to be scanned, respectively; and
  the second light beam is used to form an electrostatic latent image for a yellow image on another of the surfaces to be scanned.

13. The optical scanning apparatus according to claim 11, wherein:
  the third light beam and the fourth light beam enter the first optical scanning element through points of the input surface on an opposite side of the reference surface from the points of the input surface where the first light beam and the second light beam enter the optical scanning element;
  when the third light beam and the fourth light beam entering through points of the incident surface located at a same position in the main-scanning direction are compared with each other, an angle between the reference surface and a principal ray of the fourth light beam is greater than an angle between the reference surface and a principal ray of the third light beam; and
  when the third light beam and the fourth light beam entering through points of the incident surface located at a same position in the main-scanning direction are compared with each other, a fourth angle between the reference surface and a principal ray of a second ghost light beam is greater than a fifth angle between the reference surface and a principal ray of a third normal light beam and is smaller than a sixth angle between the reference surface and a principal ray of a fourth normal light beam, the second ghost light beam being a part of the third light beam exiting through the output surface after being reflected by the output surface and the input surface, the third normal light beam being another part of the third light beam exiting through the output surface without being reflected by either of the input surface and the output surface, the fourth normal light beam being a part of the fourth light beam exiting through the output surface without being reflected by either of the input surface and the output surface.

14. The optical scanning apparatus according to claim 13, wherein:
the first light beam, the second light beam and the third light beam are used to form an electrostatic latent image for a magenta image, an electrostatic latent image for a yellow image and an electrostatic latent image for a cyan image on three of the surfaces to be scanned, respectively; and
the fourth light beam is used to form an electrostatic latent image for a black image on another of the surfaces to be scanned.

15. The optical scanning apparatus according to claim 1, wherein a condition of $0<2n(\theta 3a-\theta 2a)<(1-n)(\theta 4b-\theta 4a)+(\theta b-\theta a)$ is fulfilled, in which:
n is a refractive index of the first optical scanning element;
$\theta a$ is an angle between the reference surface and the principal ray of the first light beam entering the first scanning element through the input surface;
$\theta b$ is an angle between the reference surface and the principal ray of the second light beam entering the first scanning element through the input surface;
$\theta 2a$ is an angle between the reference surface and a normal line to the output surface at a point where the principal ray of the first light beam entering through the input surface is incident on the output surface;
$\theta 3a$ is an angle between the reference surface and a normal line to the input surface at a point where a part of the first light beam entering through the input surface and being reflected by the output surface is incident on the input surface;
$\theta 4a$ is an angle between the reference surface and a normal line to the output surface at a point where a part of the first light beam entering through the input surface and being reflected by the output surface and the input surface is incident on the output surface to the reference surface; and
$\theta 4b$ is an angle between the reference surface and a normal line to the output surface at a point where the principal ray of the second light beam entering through the input surface is incident on the output surface.

\* \* \* \* \*